United States Patent
Sen et al.

(10) Patent No.: US 9,841,493 B2
(45) Date of Patent: Dec. 12, 2017

(54) LOCATION DETERMINATION OF A MOBILE DEVICE

(71) Applicant: Hewlett-Packard Development Company, L.P., Houston, TX (US)

(72) Inventors: Souvik Sen, Palo Alto, CA (US); Kyu-Han Kim, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/783,197

(22) PCT Filed: Apr. 12, 2013

(86) PCT No.: PCT/US2013/036501
§ 371 (c)(1),
(2) Date: Oct. 8, 2015

(87) PCT Pub. No.: WO2014/168636
PCT Pub. Date: Oct. 16, 2014

(65) Prior Publication Data
US 2016/0033616 A1    Feb. 4, 2016

(51) Int. Cl.
*H04W 4/02*    (2009.01)
*G01S 5/06*    (2006.01)
(Continued)

(52) U.S. Cl.
CPC .............. *G01S 5/06* (2013.01); *G01S 5/0036* (2013.01); *G01S 5/02* (2013.01); *G01S 5/0284* (2013.01);
(Continued)

(58) Field of Classification Search
CPC ..... H04W 4/028; H04W 4/023; H04W 12/08; H04W 48/04; H04W 4/025; H04B 7/0413;
(Continued)

(56) References Cited

U.S. PATENT DOCUMENTS 8,238,832 B1    8/2012    Zhou
2005/0130677 A1    6/2005    Meunier et al.
(Continued)

FOREIGN PATENT DOCUMENTS

KR    10-0782087 B1    12/2007
KR    10-0977246 B1    8/2010
(Continued)

OTHER PUBLICATIONS

European Search Report cited in Appl. No. EP13881625; dated Oct. 10, 2016; 7 pages.
(Continued)

*Primary Examiner* — Phuoc H Doan
(74) *Attorney, Agent, or Firm* — Hewlett Packard Enterprise Patent Department (57) ABSTRACT

A signal transmitted from a mobile device is received at an antenna array of a device. Motion information of the mobile device is received from a sensor of the mobile device. A change in the AoA of the signal is computed when the mobile device moves from a first position to a second position. The location of the mobile device relative to the antenna array is determined based on the change in AoA of the signal and the motion information of the mobile device.

11 Claims, 5 Drawing Sheets

(51) Int. Cl.
    *H04W 64/00* (2009.01)
    *G01S 5/02* (2010.01)
    *H04B 7/04* (2017.01)
    *H04W 12/08* (2009.01)
    *H04W 48/04* (2009.01)
    *G01S 5/00* (2006.01)
    *G01S 5/12* (2006.01)
    *H04W 4/20* (2009.01)

(52) U.S. Cl.
    CPC .................. *G01S 5/12* (2013.01); *H04B 7/04* (2013.01); *H04W 4/023* (2013.01); *H04W 4/025* (2013.01); *H04W 4/20* (2013.01); *H04W 12/08* (2013.01); *H04W 48/04* (2013.01); *H04W 64/00* (2013.01)

(58) Field of Classification Search
    CPC .. H04B 7/04; H04B 10/116; H04B 10/25752; G01S 5/05; G01S 5/0284; G01S 13/003; G01S 19/42; G01S 1/02
    USPC ............... 455/456.1, 456.6; 342/189, 293; 713/202; 340/10.1, 539.22
    See application file for complete search history.

(56) References Cited

U.S. PATENT DOCUMENTS

| | | |
|---|---|---|
| 2006/0139619 A1 | 6/2006 | Fujii |
| 2006/0240839 A1* | 10/2006 | Chen .................. G01S 5/06 455/456.1 |
| 2008/0297401 A1 | 12/2008 | Nishida |
| 2008/0311944 A1 | 12/2008 | Hansen et al. |
| 2009/0176507 A1* | 7/2009 | Wu .................. G01S 5/04 455/456.2 |
| 2009/0227266 A1 | 9/2009 | Baik |
| 2010/0178929 A1* | 7/2010 | Kennedy, Jr. ........... G01S 5/021 455/456.1 |
| 2010/0302102 A1 | 12/2010 | Desai et al. |
| 2011/0074633 A1 | 3/2011 | Pun et al. |
| 2011/0199263 A1 | 8/2011 | Kang et al. |
| 2011/0223940 A1 | 9/2011 | Zhong et al. |
| 2012/0063340 A1 | 3/2012 | Waters et al. |
| 2012/0083286 A1 | 4/2012 | Kim et al. |
| 2012/0258729 A1 | 10/2012 | Siomina et al. |
| 2014/0004877 A1 | 1/2014 | Van Diggelen et al. |
| 2014/0097988 A1 | 4/2014 | Beauregard |

FOREIGN PATENT DOCUMENTS

| | | |
|---|---|---|
| WO | WO-2004/032540 A1 | 4/2004 |
| WO | WO-2012/149565 A2 | 11/2012 |
| WO | WO-2013/024278 A1 | 2/2013 |

OTHER PUBLICATIONS

International Search Report and Written Opinion, International Application No. PCT/US2013/036498, dated Jan. 29, 2014, pp. 1-9.
International Search Report and Written Opinion, International Application No. PCT/US2013/036501, dated Jan. 29, 2014, pp. 1-9.
Souvik Sen et al., "Precise Indoor Localization using PHY Layer Information," Hotnets '11, Nov. 14-15, 2011, Cambridge, MA, USA, pp. 1-6, ACM.
Zengbin Zhang et al., "I Am the Antenna: Accurate Outdoor AP Location using Smartphones," MobiCom '11, Sep. 19-23, 2011, Las Vegas, NV, USA, pp. 1-12, ACM.
Sen, S., et al.; "Non-Final Office Action" cited in U.S. Appl. No. 14/782,856; dated Sep. 20, 2016; 11 pages.

* cited by examiner

LOCATION DETERMINATION OF A MOBILE DEVICE

BACKGROUND

Extensive interest in location-aware services or location based services (LBS) has driven many indoor localization techniques. For example, crowd-sourced Wi-Fi based localization techniques utilize user input for radio frequency (RF) scene analysis and map construction. Other techniques include expert based site surveys, for example.

BRIEF DESCRIPTION OF THE DRAWINGS

The present application may be more fully appreciated in connection with the following detailed description taken in conjunction with the accompanying drawings, in which like reference characters refer to like parts throughout, and in which.

DETAILED DESCRIPTION

Wi-Fi based positioning systems have become pervasive due to the development of the Wi-Fi standard. Wi-Fi based approaches to determining location of mobile devices rely on distance or angle-of-arrival (AoA) of wireless transmissions (i.e., signals and/or packets) from the mobile device as an important metric for indoor localization. For example, AoA estimation techniques can determine the angle at which a signal from the mobile device arrives at an access point (AP) (or a base station).

Existing AoA estimation techniques require multiple antennas at the AP, and work well only if these antennas are arranged in a circular manner. However, most APs today have their antennas arranged in a linear fashion (i.e., linear antenna arrays). Linear antenna arrays can only differentiate between signals from one array side. Thus, existing AoA estimation techniques cannot determine whether the mobile device is placed in front of or in the back of a linear antenna array. A circular antenna array may differentiate signals from all directions. However, a circular antenna array requires almost double the number of antennas to achieve the same accuracy as a linear antenna array. This reduces the applicability of existing AoA estimation techniques to complex and expensive circular antenna array systems. Accordingly, examples disclosed herein address the above side ambiguity challenges of AoA estimation by leveraging movement information (e.g., turn information) obtained from a sensor (e.g., gyroscope) of the mobile device.

In one example, a device includes an antenna array to receive a signal transmitted from a mobile device. The device also includes a signal processing unit to compute a change in AoA of the signal at the antenna array when the mobile device moves from a first position to a second position. The signal processing unit is to receive motion information of the mobile device from a sensor of the mobile device and determine a location of the mobile device relative to the antenna array based on the change in AoA of the signal and the motion information of the mobile device.

In another example, a method includes receiving, by an antenna of a base station, a signal transmitted from a mobile device, and computing a change in AoA of the signal when the mobile device moves from a first position to a second position. The method also includes receiving, by the signal processing unit, motion information of the mobile device from a sensor of the mobile device, and determining a location of the mobile device relative to the antenna array based on the change in AoA of the signal and the motion information of the mobile device.

In another example, a non-transitory computer-readable storage medium includes instructions that, when executed by a processor of an access point (AP), cause the processor to receive a packet embedded in a signal transmitted from a mobile device, where the packet includes motion information of the mobile device. The instructions are executable to compute an AoA of the signal at an antenna array of the AP and compute a change in the AoA of the signal when the mobile device moves from a first position to a second position. The instructions are further executable to determine a location of the mobile device relative to the antenna array based on the change in AoA of the signal and the motion information of the mobile device.

It is appreciated that examples described herein below may include various components and features. Some of the components and features may be removed and/or modified without departing from a scope of the method, system, and non-transitory computer-readable medium for AoA and motion information based location determination. It is also appreciated that, in the following description, numerous specific details are set forth to provide a thorough understanding of the examples. However, it is appreciated that the examples may be practiced without limitations to these specific details. In other instances, well known methods and structures may not be described in detail to avoid unnecessarily obscuring the description of the examples. Also, the examples may be used in combination with each other.

Reference in the specification to "an example" or similar language means that a particular feature, structure, or characteristic described in connection with the example is included in at least one example, but not necessarily in other examples. The various instances of the phrase "in one example" or similar phrases in various places in the specification are not necessarily all referring to the same example. As used herein, a component is a combination of hardware and software executing on that hardware to provide a given functionality.

Figure 1:
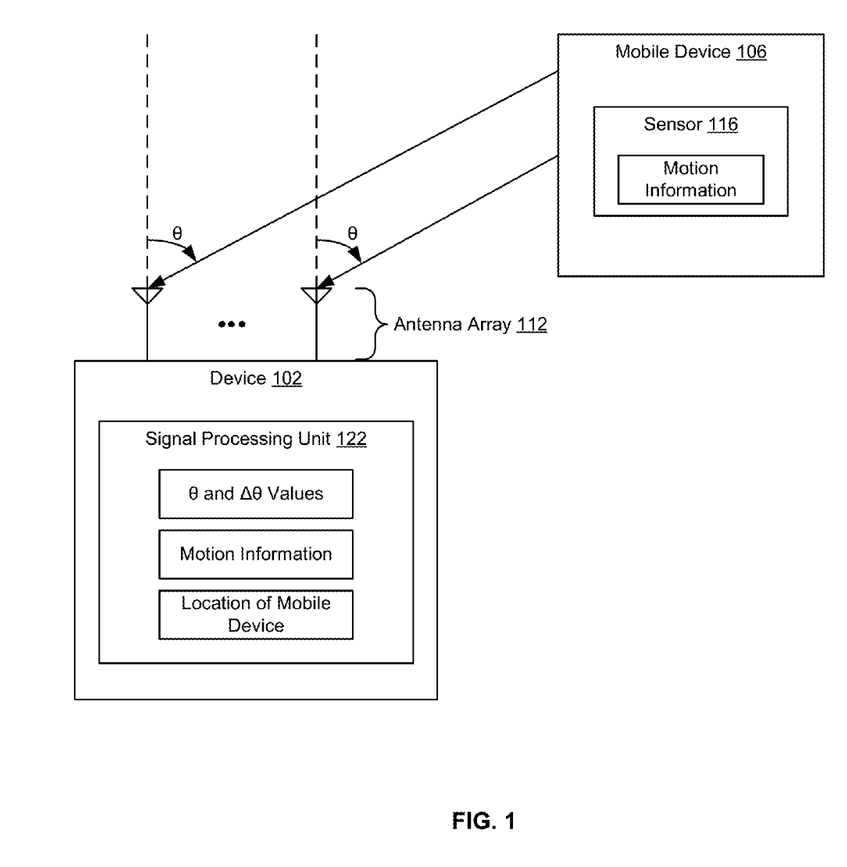
FIG. 1 is a block diagram of a device for determining a location of a mobile device, according to one example.

Referring to FIG. 1, a block diagram of a device for determining a location of a mobile device, according to one example, is described. Device 102 can be a base station, an access point (AP), a switch, a router, or any other device that includes an antenna array to transmit and receive wireless transmissions from other devices (e.g., mobile device 106). Thus, device 102 may serve as a hub of a wireless network (e.g., WLAN, cellular network). However, it should be noted that device 102 can also be a mobile device that includes an antenna array (e.g., at least two antennas) to transmit and receive wireless signals from other devices. It should further be noted that data may be transmitted from between mobile device 106 and device 102 in the form of one or more signals. Accordingly, as used herein "signal" includes data transmission (e.g., data packets).

As shown in FIG. 1, device 102 includes an antenna array 112 and a signal processing unit 122. Antenna array 112 includes at least two antennas, that may be coupled to a transceiver (not shown), for transmitting and receiving signals from a plurality of wireless devices including mobile device 106. Signal processing unit 122 can be hardware and/or software for processing signals received from mobile device 102. Mobile device 106 may include a smartphone, a mobile phone, a personal digital assistant (PDA), a portable personal computer, an AIO (all-in-one) computing device, a notebook, a convertible or hybrid notebook, a netbook, a tablet, a cellular device, a desktop computer, a multimedia player, an entertainment unit, a data communication device, a portable reading device, or any other computing device with one or more antennas for transmitting and receiving signals.

Signal processing unit 122 may compute or estimate the angle-of-arrival (AoA) of a signal transmitted from mobile device 106. A signal transmission from mobile device 106 may arrive at several angles at the device 102. Thus, signal processing unit 122 analyzes the received signal on multiple antennas of the antenna array 112 to determine an angular component of the signal. To illustrate, the phase of the received signal, a quantity that changes linearly by $2\pi$ for every wavelength ($\lambda$) traversed by the signal. For example, assuming a single path between a transmitter of the mobile device 106 and the antenna array 112 of device 102, antenna array 112 includes two antennas placed at a distance of $\lambda/2$ from each other, and $\theta$ is the angle at which the signal arrives at the two antennas. The signal traverses an extra distance before reaching the second (left) antenna. This extra distance ($\Delta d$) can be approximated as:

$$\Delta d = \lambda/2 * \sin(\theta)$$

The extra distance $\Delta d$ will result in a phase difference of ($\Delta\phi$):

$$\Delta\phi = 2\pi\Delta d/\lambda$$

Thus, by observing the phase difference ($\Delta\phi$) of the arriving signal, the AoA may be computed as:

$$\theta = \arcsin(\Delta\phi/\pi)$$

The above example assumes that the arriving signal has only one angular component. However, a wireless signal may propagate through multiple paths. AoA estimation techniques may identify the angles of multiple paths by using multiple antennas. Accordingly, signal processing unit 122 may compute AoA values for direct paths traversed by the signal and for multiple paths traversed by the path due to multipath reflections. Further, signal processing unit 122 computes a change in AoA of the signal when the mobile device moves from one position to another, as illustrated in FIG. 2.

The above described AoA computation inherently poses an ambiguity problem in linear array antennas because a range of the linear array antenna is between 0° and 180°. Thus, mobile devices 106 on the two sides (i.e., front and back) of a line formed by the linear array are not differentiable (i.e., lack of 0° and 360° range). Accordingly, the AoA computation may only differentiate between signals from one array side only (i.e., only one of front and back, but not both). To address the above limitations of the linear array antenna, signal processing unit 122 further receives or extracts motion information of the mobile device 106 to determine a location of the mobile device 106 relative to the antenna array 112. Such motion information may be provided by a sensor 116 of the mobile device. For example, a gyroscope of the mobile device may provide turn information (e.g., left or right) usable by the signal processing unit 122 to determine whether the mobile device 106 is in front of or behind the antenna array, thereby providing a 360° location range of the mobile device 106.

Figure 2:
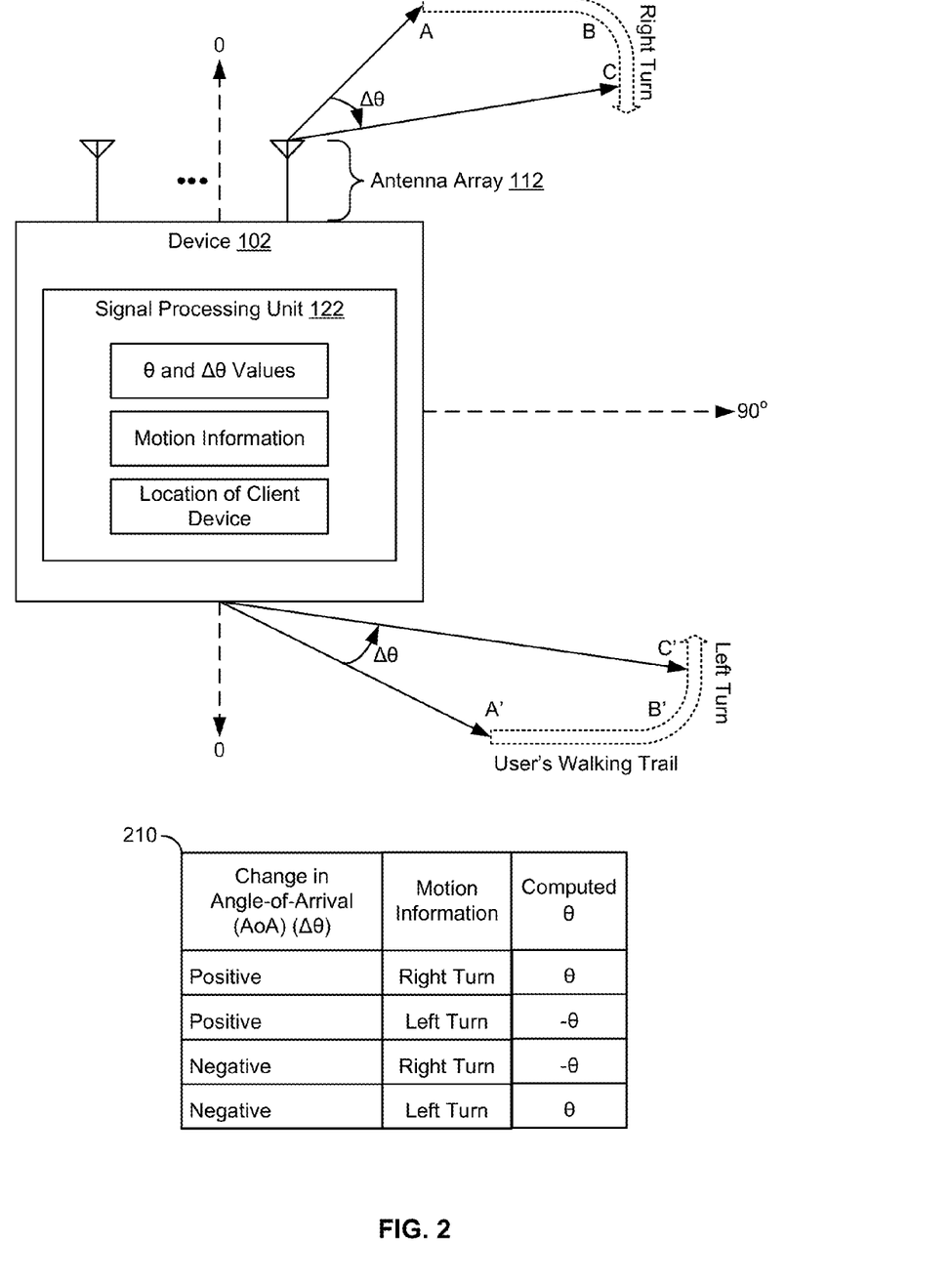
FIG. 2 is a block diagram of a device for determining a location of a mobile device, according to one example.

FIG. 2 is a block diagram of a device for determining a location of a mobile device, according to one example. The example of FIG. 2 describes how the signal processing unit 122 may resolve the ambiguity issue to determine whether mobile device 106 is located in the front, or back side of antenna array 112 by observing the change in the AoA of the signal and the nature of turn undertaken by a user of the mobile device 106 (i.e., movement information) provided by a sensor (e.g., gyroscope) of the mobile device.

The gyroscope of the mobile device 102, for example, may track the angular changes as a user walks from one location to another. The gyroscope information may be preferred over compass information for indoor localization because gyroscopes remain unaffected by changing magnetic fields (e.g., due to metallic and electrical objects in buildings), and computes relative angular velocity usable by the signal processing unit 122.

As shown in FIG. 2, a user of the mobile device 106 may begin at a first position A and end up at a second position C. While walking from position A to position C, the user takes a turn at B. The AoA of the signal from the user's mobile device 106 increases as the user walks from A to C. The linear antenna array 112 cannot distinguish or differentiate between angles on the two sides of the linear array (i.e., in the front and in the back). For example, the linear array antenna cannot distinguish between the change in AoA above the 90° axis and below the 90° axis. Hence, the change in AoA ($\Delta\theta$) will be the same at the antenna array 112 if the user walks through ABC or A'B'C', as shown in FIG. 2.

However, the tie between the change in AoA ($\Delta\theta$) for ABC and A'B'C' may be resolved by observing the turn the user undertook. If the gyroscope of the user's mobile device 106 registered a right turn, the signal processing unit 122 determines that the user is located in the front of the antenna array 112. On the other hand, if the user took a left turn, the user was walking through A'B'C', and the signal processing unit 122 determines that the user is located in the back of the antenna array 112.

Thus, the signal processing unit 122 is able to determine whether the mobile device 106 is located in the front, or back side (behind) of the antenna array 112 based on the change in AoA ($\Delta\theta$) and the movement information (i.e., turn) of the mobile device 106. Table 210 illustrates how the change in AoA ($\Delta\theta$) is combined with the motion information to determine the location of the mobile device 106 relative to the antenna array. For example, if the change in AoA ($\Delta\theta$) is positive and the sensor indicates a right turn, then the computed AoA ($\theta$) for the mobile device 106 is determined to be positive (i.e., $\theta$). As another example, if the change in AoA ($\Delta\theta$) is positive and the sensor indicates a left turn, then the computed AoA ($\theta$) of the mobile device 106 is determined to be negative (i.e., $-\theta$). As another example, if the change in AoA ($\Delta\theta$) is negative and the sensor indicates a right turn, then the computed AoA ($\theta$) of the mobile device 106 is determined to be negative (i.e., $-\theta$). As another example, if the change in AoA ($\Delta\theta$) is negative and the sensor indicates a left turn, then the computed AoA ($\theta$) of the mobile device 106 is determined to be positive (i.e., $\theta$). Accordingly, the computed AoA remains the same if the mobile device 106 is in front of the antenna array 112, for example. However, a negative AoA is used as the actual angle if the mobile device is in the back of the antenna array 112, for example.

Figure 3:
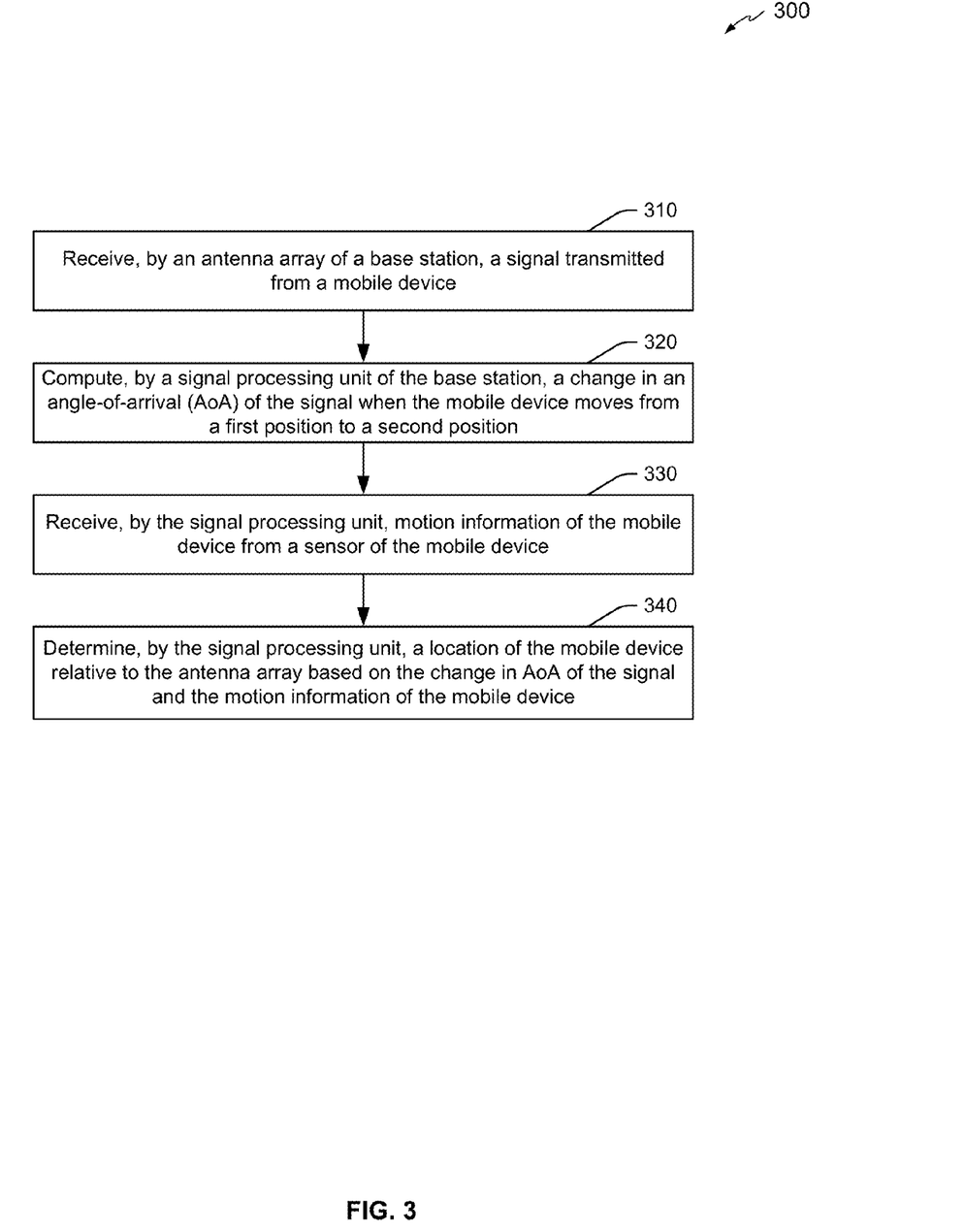
FIG. 3 is a flowchart of a method for determining a location of a mobile device, according to one example.

FIG. 3 is a flowchart of a method 300 for determining a location of a mobile device, according to one example. Method 300 may be implemented in the form of executable instructions stored on a non-transitory computer-readable storage medium and/or in the form of electronic circuitry.

Method 300 includes receiving, by an antenna array of a base station, a signal transmitted from a mobile device, at 310. For example, antenna array 112 may receive a signal transmitted from mobile device 106. The base station 102 may include, for example, a WLAN AP, a mobile device, a cellular base station, or any other computing device that includes multiple antennas for transmitting and/or receiving signals from other devices. Antenna array 112 may include at least one of a linear antenna array, an omnidirectional array, and a directional array.

Method 300 includes, computing by a signal processing unit of the base station, a change in AoA of the signal when the mobile device moves from a first position to a second position, at 320. For example, signal processing unit 122 may compute the AoA of the signal at the antenna array 112 and a change in the AoA of the signal when the mobile device 106 moves from one position to another.

Method 300 includes receiving, by the signal processing unit, motion information of the mobile device from a sensor of the mobile device, at 330. For example, sensor 116 of the mobile device 106 may provide turn information (i.e., left or right) of the mobile device 106 as the user moves from one position to another. In one example, the sensor 116 is a gyroscope. In other examples, the sensor 116 is a compass. The motion information may be embedded in a data packet transmitted from the mobile device 106 to the base station 102. As such, the motion information may be part of the signal transmitted from the mobile device 106 to the base station 102.

Method 300 includes determining, by the signal processing unit, a location of the mobile device relative to the antenna array based on the change in AoA of the signal and the motion information of the mobile device, at 340. For example, the signal processing unit 122 may distinguish between a signal transmitted from the mobile device 106 when the mobile device 106 is in front of the antenna array 112 and a signal transmitted from the mobile device 106 when the mobile device 106 is behind the antenna array 112. Further, the location of the mobile device 106 relative to the antenna array 112 is usable by the base station 102 to detect security violations in the network and to detect rogue mobile devices in the network. Moreover, the location information may be usable by the mobile device 106 to determine whether or not to associate with the base station 102.

Figure 4:
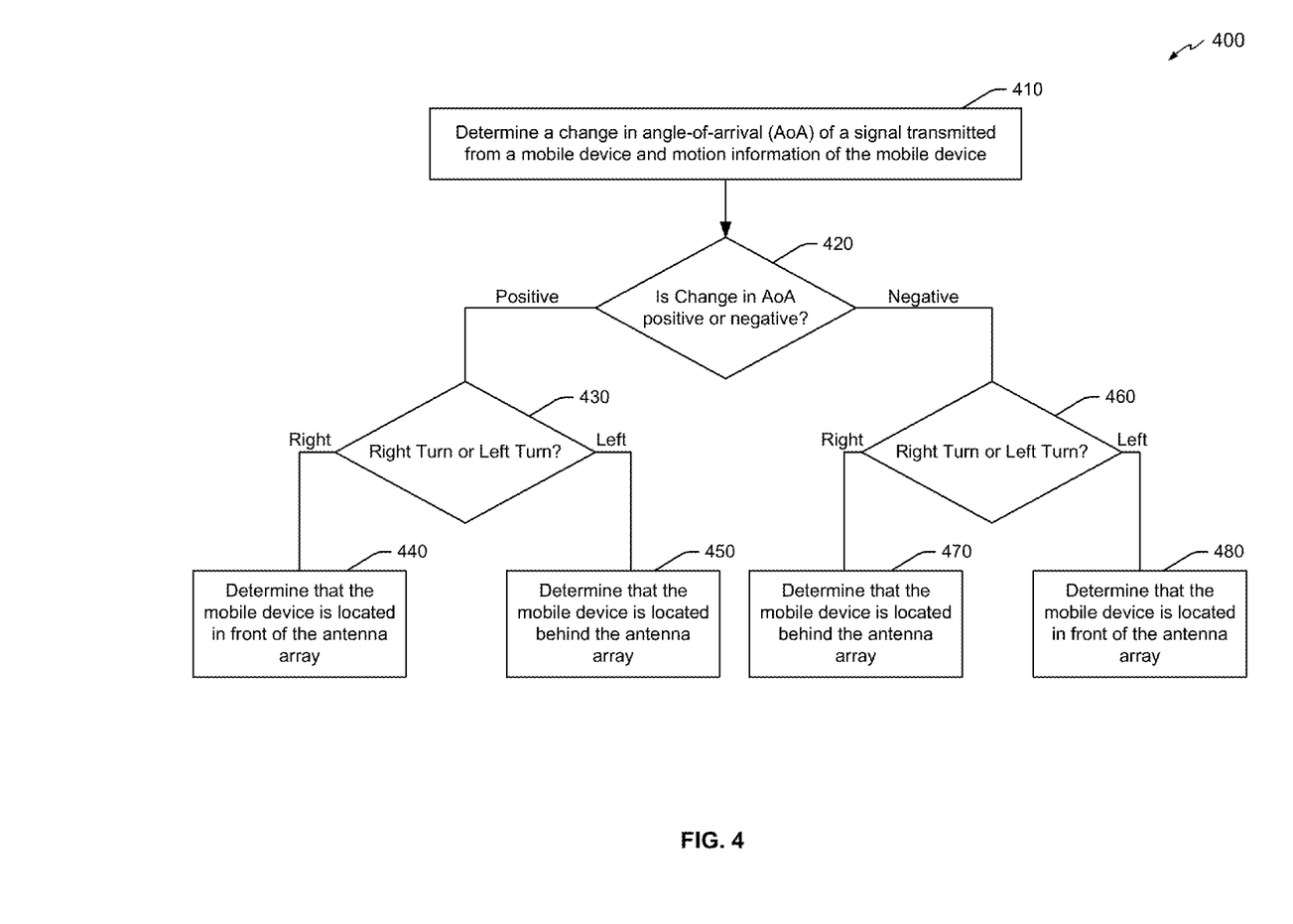
FIG. 4 is a flowchart of a method for determining a location of a mobile device, according to one example.

FIG. 4 is a flowchart of a method 400 for determining a location of a mobile device, according to one example. Method 400 may be implemented in the form of executable instructions stored on a non-transitory computer-readable storage medium and/or in the form of electronic circuitry.

Method 400 includes determining a change in AoA of a signal transmitted from a mobile device and motion information of the mobile device, at 410. For example, the signal processing unit 122 may compute the change in AoA of the signal as the user moves from a first position to a second position. Further, the signal processing unit 122 may receive or extract motion information provided by sensor 116 of the mobile device 106.

Method 400 includes determining whether the change in AoA of the signal is positive or negative, at 420. If it is determined that the change in AoA of the signal is positive, method 400 includes determining whether the motion information indicates a left turn or a right turn, at 430. If it is determined that the motion information indicates a right turn, method 400 includes determining that the mobile device is located in front of the antenna array, at 440. If however, it is determined that the motion information indicates a left turn, method 400 includes determining that the mobile device is located behind the antenna array, at 450.

If it is determined, at 420 that the change in AoA of the signal is negative, method 400 includes determining whether the motion information indicates a left turn or a right turn, at 460. If it is determined that the motion information indicates a right turn, method 400 includes determining that the mobile device is located behind the antenna array, at 470. If however, it is determined that the motion information indicates a left turn, method 400 includes determining that the mobile device is located in front of the antenna array, at 480.

Figure 5:
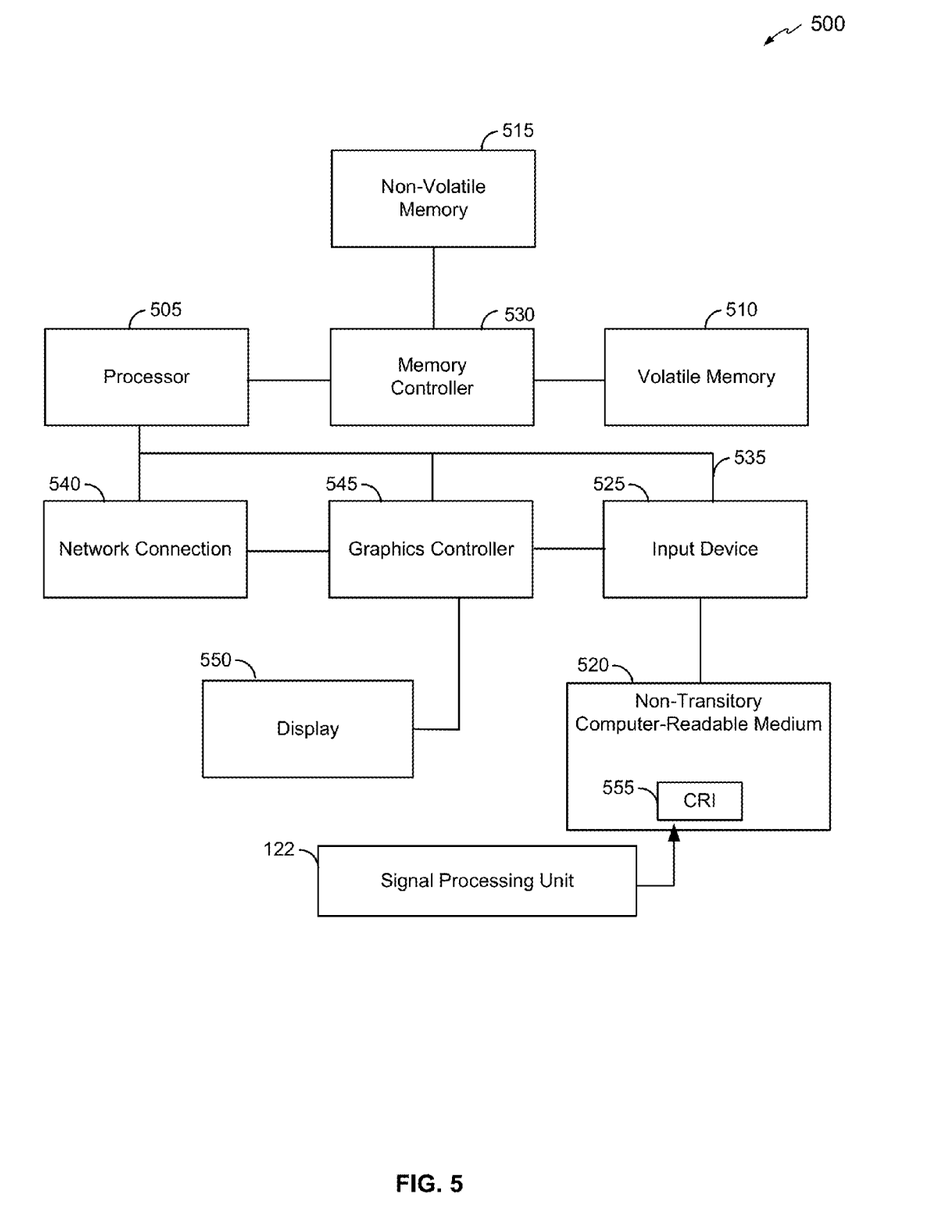
FIG. 5 is a block diagram of an example component for implementing the device of FIGS. 1 and 2, according to various examples.

The signal processing unit 122 of FIGS. 1 and 2 can be implemented in hardware, software, or a combination of both. FIG. 5 illustrates a component for implementing the signal processing unit 122 according to various examples. The component 500 can include a processor 505 and memory resources, such as, for example, the volatile memory 510 and/or the non-volatile memory 515, for executing instructions stored in a tangible non-transitory medium (e.g., volatile memory 510, non-volatile memory 515, and/or non-transitory computer-readable medium 520). The non-transitory computer-readable medium 520 can have computer-readable instructions 555 stored thereon that are executed by the processor 505 to implement the functionalities according the present disclosure.

A machine (e.g., a computing device) can include and/or receive a tangible non-transitory computer-readable medium 520 storing a set of computer-readable instructions (e.g., software) via an input device 525. As used herein, the processor 505 can include one or a plurality of processors such as in a parallel processing system. The memory can include memory addressable by the processor 505 for execution of computer readable instructions. The computer readable medium 520 can include volatile and/or non-volatile memory such as a random access memory ("RAM"), magnetic memory such as hard disk, floppy disk, and/or tape memory, a solid state drive ("SSD"), flash memory, phase change memory, and so on. In some examples, the non-volatile memory 515 can be a local or remote database including a plurality of physical non-volatile memory devices.

The processor 505 can control the overall operation of the component 500. The processor can be connected to a memory controller 530, which can read and/or write data from and/or to volatile memory 510 (e.g., RAM). The processor 505 can be connected to a bus 535 to provide communication between the processor 505, the network connection 540, and other portions of the component 500. The non-volatile memory 515 can provide persistent data storage for the component 500. Further, the graphics controller 545 can connect to an optical display 550.

Each component 500 can include a computing device including control circuitry such as a processor, a state machine, ASIC, controller, and/or similar machine. As used herein, the indefinite articles "a" and/or "an" can indicate one or more of the named objects. Thus, for example, "a processor" can include one or more than one processor, such as in a multi-core processor, cluster, or parallel processing arrangement.

It is appreciated that the previous description of the disclosed examples is provided to enable any person skilled in the art to make or use the present disclosure. Various modifications to these examples will be readily apparent to those skilled in the art, and the generic principles defined herein may be applied to other examples without departing from the spirit or scope of the disclosure. Thus, the present disclosure is not intended to be limited to the examples shown herein but is to be accorded the widest scope consistent with the principles and novel features disclosed herein. For example, it is appreciate that the present disclosure is not limited to a particular configuration, such as component 500.

Those skilled in the art would further appreciate that the various illustrative modules and steps described in connection with the examples disclosed herein may be implemented as electronic hardware, computer software, or combination of both. For example, the steps of FIGS. 3 and 4 may be implemented using software modules, hardware modules or components, or a combination of software and hardware modules or components. Thus, in one example, one or more of the steps of FIGS. 3 and 4 may comprise hardware modules or components. In another example, one or more of the steps of FIGS. 3 and 4 may comprise software code stored on a computer readable storage medium, which is executable by a processor.

To clearly illustrate this interchangeability of hardware and software, various illustrative components, blocks, modules, and steps have been described above generally in terms of their functionality (e.g., signal processing unit 122). Whether such functionality is implemented as hardware or software depends upon the particular application and design constraints imposed on the overall system. Those skilled in the art may implement the described functionality in varying ways for each particular application, but such implementation decisions should not be interpreted as causing a departure from the scope of the present disclosure.

What is claimed is:

1. A device comprising:
an antenna array to receive a signal transmitted from a mobile device;
a signal processing unit to:
compute a change in angle-of-arrival (AoA) of the signal at the antenna array when the mobile device moves from a first position to a second position;
receive motion information of the mobile device from a sensor of the mobile device; and
determine a location of the mobile device relative to the antenna array based on the change in AoA of the signal and the motion information of the mobile device,
wherein the motion information of the mobile device comprises at least one of a left turn and a right turn,
wherein the location of the mobile device relative to the antenna array comprises at least one of a front side of the antenna array and a back side of the antenna array,
the signal processing unit to differentiate between the change in AoA when the mobile device is located in front of the antenna array and when the mobile device is located on the back side of the antenna array,
when the change in AoA of the signal is positive and the motion information indicates a right turn, the mobile device is determined to be located on the front side of the antenna array;
when the change in AoA of the signal is positive and the motion information indicates a left turn, the mobile device is determined to be located on the back side of the antenna array;

when the change in AoA of the signal is negative and the motion information indicates a right turn, the mobile device is determined to be located on the back side of the antenna array; and
when the change in AoA of the signal is negative and the motion information indicates a left turn, the mobile device is determined to be located on the front side of the antenna array.

2. The device of claim 1, wherein the AoA comprises at least one of an angle of direct path (ANDP) of the signal and angle of multipath reflections of the signal.

3. The device of claim 1, wherein the antenna array comprises at least one of a linear antenna, an omnidirectional antenna, and a directional antenna.

4. The device of claim 1, wherein the antenna array includes a first antenna and a second antenna, and wherein the signal processing unit is to compute a first change in AoA of the signal at the first antenna and a second change in AoA of the signal at the second antenna.

5. The device of claim 1, wherein the motion information of the mobile device includes a left turn or a right turn motion of the mobile device.

6. A method comprising:
receiving, by an antenna array of a base station, a signal transmitted from a mobile device;
computing, by a signal processing unit of the base station, a change in angle-of-arrival (AoA) of the signal when the mobile device moves from a first position to a second position;
receiving, by the signal processing unit, motion information of the mobile device from a sensor of the mobile device;
determining, by the signal processing unit, a location of the mobile device relative to the antenna array based on the change in AoA of the signal and the motion information of the mobile device,
when the change in AoA of the signal is positive and the motion information indicates a right turn, the mobile device is located in front of the antenna array;
when the change in AoA of the signal is positive and the motion information indicates a left turn, the mobile device is located behind the antenna array;
when the change in AoA of the signal is negative and the motion information indicates a right turn, the mobile device is located behind the antenna array; and
when the change in AoA of the signal is negative and the motion information indicates a left turn, the mobile device is located in front of the antenna array.

7. The method of claim 6, wherein the sensor includes at least one of a gyroscope and a compass.

8. The method of claim 6, wherein the base station comprises at least one of a wireless local area network (WLAN) access point (AP), a second mobile device, a cellular base station, and any computing device comprising at least two antennas.

9. The method of claim 6, wherein the location of the mobile device relative to the antenna array is usable by the base station to determine security violations in a network of the base station and to detect rogue mobile devices in the network.

10. The method of claim 6, wherein the location of the mobile device relative to the antenna array is usable by the mobile device to determine whether to associate with the base station.

11. A non-transitory computer-readable storage medium comprising instructions that, when executed by a processor of an access point (AP), cause the processor to:

receive a packet embedded in a signal transmitted from a mobile device, wherein the packet includes motion information of the mobile device;

compute an angle-of arrival (AoA) of the signal at an antenna array of the AP;

compute a change in the AoA of the signal when the mobile device moves from a first position to a second position; and determine a location of the mobile device relative to the antenna array based on the change in AoA of the signal and the motion information of the mobile device, when the change in AoA of the signal is positive and the motion information indicates a right turn, the mobile device is located in a front side of the antenna array;

when the change in AoA of the signal is positive and the motion information indicates a left turn, the mobile device is located in a back side of the antenna array;

when the change in AoA of the signal is negative and the motion information indicates a right turn, the mobile device is located in the back side of the antenna array; and when the change in AoA of the signal is negative and the motion information indicates a left turn, the mobile device is located in the front side of the antenna array.

* * * * *